(12) United States Patent
Mah et al.

(10) Patent No.: US 9,178,214 B2
(45) Date of Patent: Nov. 3, 2015

(54) ANODE ACTIVE MATERIAL FOR LITHIUM RECHARGEABLE BATTERY, METHOD OF PREPARING THE SAME, AND LITHIUM BATTERY INCLUDING THE ANODE ACTIVE MATERIAL

(71) Applicant: SAMSUNG ELECTRONICS CO., LTD, Suwon-si, Gyeonggi-do (KR)

(72) Inventors: Sang-kook Mah, Seoul (KR); Ryoung-hee Kim, Yongin-si (KR)

(73) Assignee: SAMSUNG ELECTRONICS CO., LTD. (KR)

( * ) Notice: Subject to any disclaimer, the term of this patent is extended or adjusted under 35 U.S.C. 154(b) by 227 days.

(21) Appl. No.: 13/692,232

(22) Filed: Dec. 3, 2012

(65) Prior Publication Data

US 2013/0143119 A1    Jun. 6, 2013

(30) Foreign Application Priority Data

Dec. 2, 2011    (KR) ........................ 10-2011-0128528

(51) Int. Cl.
| | |
|---|---|
| *H01M 4/00* | (2006.01) |
| *H01M 4/13* | (2010.01) |
| *H01M 4/58* | (2010.01) |
| *H01M 4/36* | (2006.01) |
| *H01M 4/38* | (2006.01) |
| *H01M 4/485* | (2010.01) |

(52) U.S. Cl.
CPC ................ *H01M 4/58* (2013.01); *H01M 4/366* (2013.01); *H01M 4/386* (2013.01); *H01M 4/485* (2013.01); *H01M 4/13* (2013.01); *Y02E 60/122* (2013.01)

(58) Field of Classification Search
None
See application file for complete search history.

(56) References Cited

U.S. PATENT DOCUMENTS

| | | | | |
|---|---|---|---|---|
| 5,314,765 | A * | 5/1994 | Bates ........................ | 429/231.95 |
| 5,980,977 | A * | 11/1999 | Deng et al. ...................... | 427/79 |
| 6,042,969 | A * | 3/2000 | Yamada et al. ............ | 429/218.1 |
| 6,242,132 | B1 * | 6/2001 | Neudecker et al. ......... | 429/218.1 |
| 6,733,924 | B1 * | 5/2004 | Skotheim et al. ......... | 429/231.95 |
| 2002/0182479 | A1 * | 12/2002 | Mallari et al. ................... | 429/44 |
| 2004/0185343 | A1 * | 9/2004 | Wang et al. ................. | 429/218.1 |
| 2006/0147797 | A1 | 7/2006 | Wu et al. | |
| 2007/0128884 | A1 * | 6/2007 | Ota et al. ....................... | 438/778 |
| 2009/0258295 | A1 * | 10/2009 | Niessen et al. ................ | 429/219 |
| 2010/0297504 | A1 * | 11/2010 | Oki et al. ................. | 429/231.95 |

FOREIGN PATENT DOCUMENTS

| | | |
|---|---|---|
| JP | 103920 A | 1/1998 |
| JP | 2000012018 A | 1/2000 |
| JP | 200359492 A | 2/2003 |
| JP | 200556705 A | 3/2005 |
| JP | 2005166684 A | 6/2005 |
| JP | 2006190642 A | 7/2006 |
| JP | 2007242590 A | 9/2007 |
| JP | 2011001254 A | 1/2011 |
| KR | 1020070108579 A | 11/2007 |
| KR | 1020100066026 A | 6/2010 |
| KR | 1020110040478 A | 4/2011 |
| KR | 1020110041813 A | 4/2011 |
| KR | 1020110046076 A | 5/2011 |

* cited by examiner

*Primary Examiner* — Patrick Ryan
*Assistant Examiner* — Jose Colucci Rios
(74) *Attorney, Agent, or Firm* — Cantor Colburn LLP

(57) ABSTRACT

An anode active material for a lithium rechargeable battery, the anode active material including: a base material which is alloyable with lithium and a metal nitride disposed on the base material.

22 Claims, 4 Drawing Sheets

ANODE ACTIVE MATERIAL FOR LITHIUM RECHARGEABLE BATTERY, METHOD OF PREPARING THE SAME, AND LITHIUM BATTERY INCLUDING THE ANODE ACTIVE MATERIAL

This application claims priority to and the benefit of Korean Patent Application No. 10-2011-0128528, filed on Dec. 2, 2011, and all the benefits accruing therefrom under 35 U.S.C. §119, the content of which is incorporated herein in its entirety by reference.

BACKGROUND

1. Field

The present disclosure relates to an anode active material for a lithium rechargeable battery, methods of preparing the anode active material, and a lithium rechargeable battery including the anode active material.

2. Description of the Related Art

Lithium metal has been used as an anode active material in a lithium battery. When the lithium metal is used, however, dendrites are formed which can result in a short-circuit, increasing a possibility of an explosion. Accordingly, instead of lithium metal, a carbonaceous material is often used as an anode active material in commercially available lithium ion batteries.

As a carbonaceous active material, a crystalline carbon, such as graphite or artificial graphite, and an amorphous carbon, such as soft carbon and hard carbon, may be used. The amorphous carbon has high capacity, but during charging and discharging lithium intercalation in the amorphous carbon is highly irreversible. Crystalline carbon has a relatively high theoretical capacity, but there are practical limitations to the capacity of crystalline carbon such that its capacity is unsatisfactory for a high-capacity lithium battery.

Metal-based and intermetallic compound-based anode active materials are being studied to resolve these problems. Metals can intercalate or deintercalate more lithium than a carbonaceous anode active material. However, when compared to a carbonaceous material, the metals have poor cycle characteristics, hampering their practical use. Thus there remains a need for an improved anode active material for a high capacity battery.

SUMMARY

Provided is an anode active material suitable for a lithium rechargeable battery and having excellent initial efficiency and lifespan characteristics.

Provided is an anode including the anode active material.

Provided is a lithium rechargeable battery including the anode.

Provided are methods of preparing the anode active material.

Additional aspects will be set forth in part in the description which follows and, in part, will be apparent from the description.

According to an aspect, an anode active material for a lithium rechargeable battery includes: a base material which is alloyable with lithium; and a metal nitride disposed on the base material.

According to another aspect, an anode includes the anode active material.

According to another aspect, a lithium rechargeable battery includes the anode.

According to another aspect, a method of preparing the anode active material includes: contacting a base material which is alloyable with lithium with at least one selected from a metal oxide precursor and a metal oxide to prepare a mixture; and heat treating the mixture in an atmosphere including at least one selected from nitrogen and ammonia to prepare the anode active material.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
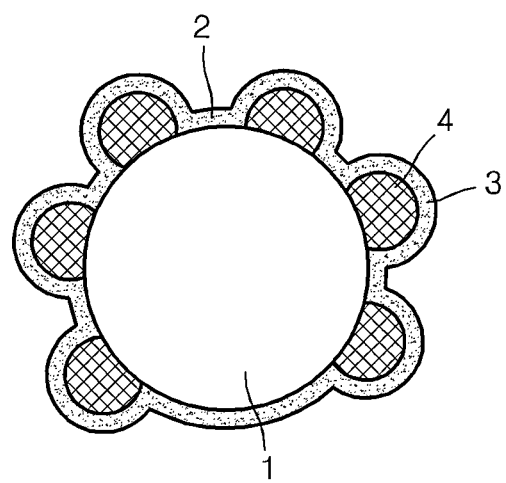
FIG. 1 is a schematic cross-sectional view of an embodiment of an anode active material for a lithium rechargeable battery.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. Expressions such as "at least one of," when preceding a list of elements, modify the entire list of elements and do not modify the individual elements of the list.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

A nitride (e.g., silicon nitride) comprises nitrogen and may optionally comprise oxygen, such as a product of incompletely nitrided silicon oxide (e.g., silicon oxynitride).

A C rate means a current which will discharge a battery in one hour, e.g., a C rate for a battery having a discharge capacity of 1.6 ampere-hours would be 1.6 amperes.

Hereinafter, an embodiment is described in further detail.

A lithium battery including a metal or a semimetal, such as a metal selected from aluminum, germanium, silicon, tin, zinc, and lead, as an anode active material has high capacity and high energy density. Also, such an anode active material has a greater reversible lithium capacity than a carbonaceous material, that is it can intercalate and deintercalate more lithium than a carbonaceous anode active material. Thus anode active materials comprising a metal or a semimetal may be suitable for the production of a battery having high capacity and high energy density. For example, it is known that pure silicon has a theoretical capacity of 4000 milliampere-hours per gram (mAh/g) or more.

However, compared to a carbonaceous material, the anode active material comprising a metal or a semimetal has poor cycle characteristics. Such cycle characteristics hamper its practical use. While not wanting to be bound by theory, it is understood that the reason is that if inorganic particles, such as silicon or tin, are used as an anode active material, which is a material that intercalates and deintercalates lithium (e.g., alloys and de-alloys with lithium), conductivity of active material particles may be reduced due to a volumetric change which occurs during charging and discharging. Also, the anode active material may be separated or disconnected from an anode current collector. That is, inorganic particles, e.g., silicon or tin particles, included in the anode active material can intercalate or alloy lithium during charging and thus their volume can increase by about 300 to 400%. Also, when lithium is deintercalated or dealloyed therefrom during discharging, the inorganic particles shrink. While not wanting to be bound by theory, it is understood that if this charging and discharging cycle is repeated, electrical isolation may occur when a space is formed between the inorganic particles, significantly reducing a lifespan of a battery.

This phenomenon may be prevented by coating the metal nanoparticles with carbon. While not wanting to be bound by theory, it is understood that due to the breakable properties of carbon, however, carbon may crack when the metal expands during charging, and during discharging carbon may shrink, leaving a space that can electrically isolate the metal. Accordingly, this method does not suitably improve the lifespan of a battery.

An anode active material according to an embodiment includes: a base material which is alloyable with lithium; and a metal nitride disposed on the base material.

According to an embodiment, the base material which is alloyable with lithium is included in the anode active material and can substantially or effectively prevent lifespan deterioration due to shrinkage/expansion during charging and discharging. Also, the metal nitride is disposed on the base material and can improve the initial efficiency and lifespan characteristics of a lithium rechargeable battery including the anode active material.

According to an embodiment, the metal nitride may be prepared by nitriding an oxide of at least one metal selected from Li, Ti, Al, Zr, and Si. In this regard, the metal oxide may include either a natural oxide, which is an oxide that may be originally present on a base material, and a metal oxide that may be optionally present.

For example, the metal oxide may be at least one selected from $SiO_2$, $TiO_2$, $Al_2O_3$, $ZrO_2$, $Li_dAl_eO$, $Li_dSi_eO$, $Li_dTi_eO$, and $Li_dZr_eO$, wherein e/d may be about 0.5 to about 2, specifically about 0.6 to about 1.8, more specifically about 0.7 to about 1.6.

In an embodiment a combination of metal nitrides, e.g., a first metal nitride and a second metal nitride, may be used. The metal nitride may include at least one bond selected from Li—N, Li—O—N, Ti—N, Ti—O—N, Al—N, Al—O—N, Zr—N, Zr—O—N, Si—N, and Si—O—N. For example, if the base material comprises silicon and the metal oxide comprises titanium oxide, the metal nitride may include at least one bond selected from Si—N, Ti—N, Si—O—N, and Ti—O—N.

Also, in the metal nitride, an atomic concentration ratio of oxygen to nitrogen may be about 0.04 to about 0.95, specifically about 0.05 to about 0.85, for example, about 0.05 to about 0.6, when determined by X-ray photoelectron spectroscopy analysis of the oxygen 1s and nitrogen 1s peaks.

According to an embodiment, the anode active material according to an embodiment may include, in addition to the metal nitride, a metal oxide that is incompletely nitrided. For example, if the oxide is incompletely converted to the nitride, oxygen may be present and the metal nitride may be an oxynitride. In an embodiment, the metal nitride may comprise at least one metal selected from Li, Ti, Al, Zr, and Si, nitrogen, and optionally oxygen, and it is understood that the metal is bonded to nitrogen and optionally oxygen, if present.

The base material which is alloyable with lithium may be an alloy and may further comprise at least one metal selected from Al, Ca, Cu, Mg, Ni, and Ti.

The base material which is alloyable with lithium may be at least one selected from Si, $SiO_x$ wherein $0<x<2$, and a Si alloy. Examples of the Si alloy include at least one selected from $AlSi_2$, $Cu_5Si$, $Mg_2Si$, NiSi, $TiSi_2$, and $Si_7Ti_4Ni_4$.

Also, the alloy may be formed by contacting (e.g., reacting) a metal oxide with the base material which is alloyable with lithium during heat-treating or nitriding. For example, Si may be reacted with $TiO_2$ to produce $TiSi_2$.

The shape of the base material is non-limited, and may be for example, rectilinear, curvilinear, a spherical shape, a needle shape, a tubular shape, or a porous structure. An average diameter, e.g., particle size, or average largest diameter, of the base material may be about 3 nanometers (nm) to about 10,000 nm, specifically about 6 nm to about 5,000 nm, more specifically about 12 nm to about 2,500 nm.

According to an embodiment, a content of the metal nitride in the anode active material may be about 0.2 to about 80 weight percent (wt %), specifically about 1 to about 50 wt %, for example, about 5 to about 30 wt %, based on a total weight of the anode active material, to provide an active material having a suitable capacity. A weight ratio of the metal nitride to the base material may be about 0.01 to about 10, specifically about 0.1 to about 5, more specifically about 0.2 to about 1.

The anode active material that includes the metal nitride may further include at least one selected from an electrically conductive material and an ionically conductive material. For example, the electrically conductive material may be at least one selected from carbon and a metal of Groups 3 to 14 of the Periodic Table, specifically a metal of Groups 4 to 13 of the Periodic Table. The ionically conductive material may be a lithium phosphate, such as lithium titanium phosphate, lithium aluminum titanium phosphate ("LATP"), lithium aluminum germanium phosphate, and lithium hafnium phosphate for example.

According to an embodiment, the arrangement of the base material which is alloyable with lithium, the metal nitride, the metal oxide if present, and optionally the electrically conductive material and/or the ionically conductive material included in the anode active material may not be particularly limited. For example, the anode active material may have a core-shell structure in which the base material which is alloyable with lithium constitutes a core of the anode active material and the other components surround the base material, or a structure in which the other components are regularly or irregularly disposed on the base material.

FIG. 1 is a schematic cross-sectional view of an embodiment of an anode active material for a lithium rechargeable battery.

Referring to FIG. 1, a first metal nitride 2, for example, a material including Si—N or Si—O—N, and a second metal nitride 3, for example Ti—N or Ti—O—N 3 are located on the surface of a base material 1 which is alloyable with lithium, for example, Si. Also, a metal oxide that is incompletely nitrided 4, for example, Li—Ti—O or Ti—O may be present on the base material. In an embodiment, the metal nitride may comprise a combination of metals, e.g., Si and Ti.

Also, if a carbon component is additionally included in the anode active material for a lithium rechargeable battery, the carbon component may be present inside or outside the metal nitride. In an embodiment, the metal nitride is disposed between the carbon component and the base material. In another embodiment the anode active material comprises a core comprising the base material and a shell comprising the metal nitride and the optional carbon component.

As described above, due to the inclusion of the base material, which is alloyable with lithium, and the metal nitride, the anode active material for a lithium rechargeable battery may have excellent initial efficiency and lifespan characteristics.

Also, the base material which is alloyable with lithium may be disposed on, e.g., coated on, a portion of a substrate, or the base material which is alloyable with lithium may be grown on a substrate. The base material may be a bulk material, or may be in the form of a thin film.

A method of preparing an anode active material includes contacting, e.g., mixing, a base material which is alloyable with lithium with a metal oxide precursor or a metal oxide to prepare a mixture; and heat treating the mixture in an atmosphere comprising nitrogen or ammonia to prepare the anode active material. In an embodiment the atmosphere consists of nitrogen or ammonia. In an embodiment, the metal nitride may be formed on the base material.

If a metal oxide is used, the contacting of the base material and the metal oxide may be performed by, for example, mixing the base material and the metal oxide. The metal oxide may be present in the mixture in an amount of about 1 to 50 wt %, specifically about 5 to about 30 wt %, more specifically about 10 to about 25 wt %, based on a total weight of the base material.

If a metal oxide precursor is used, the contacting of the base material and the metal oxide precursor may be performed by, for example, dispersing the base material in a solvent. Examples of suitable organic solvents include alcohols (e.g., methanol, ethanol, butanol); water; liquid carbon dioxide; aldehydes (e.g., acetaldehydes, propionaldehydes), formamides (e.g., N,N-dimethylformamide); ketones (e.g., acetone, methyl ethyl ketone, β-bromoethyl isopropyl ketone); acetonitrile; sulfoxides (e.g., dimethylsulfoxide, diphenylsulfoxide, ethyl phenyl sulfoxide); sulfones (e.g., diethyl sulfone, phenyl 7-quinolylsulfone); thiophenes (e.g., thiophene 1-oxide); acetates (e.g., ethylene glycol diacetate, n-hexyl acetate, 2-ethylhexyl acetate); amides (e.g., propanamide, benzamide) or the like, or a combination comprising at least one of the foregoing solvents. Ethanol is specifically mentioned. The solvent may be present in an amount of at least 10 times the weight of the base material. The base material and the solvent may be first combined, and then mixed with the metal oxide precursor. The base material may be dispersed in the solvent using ultrasonic treatment.

The method may further include milling the base material which is alloyable with lithium with either the metal oxide or the metal oxide precursor. For example, the milling may be performed using a SPEX mill for about 1 hour to about 20 hours, specifically about 3 to about 6 hours. For example, if an amount of the solvent used in mixing of the base material and the metal oxide precursor is relatively small, the method may further include milling.

Following the contacting (and optionally the milling) of the base material and the metal oxide precursor, the solvent may be removed. The solvent may be removed under ambient pressure or reduced pressure at a temperature of room temperature to about 90° C. In an embodiment, the solvent is removed at a pressure of about 10 to about 101 kiloPascals (kPa), specifically about 100 to about 95 kPa. The temperature may be about 20 to about 90° C., specifically about 25 to about 85° C., more specifically about 30 to about 80° C.

The metal oxide precursor may not be limited and may be a halide, a hydroxide, or an alkoxide of metal, and the alkoxide may be an alkoxide having 1 to 7 carbon atoms. The halide may be at least one selected from a fluoride, a chloride, a bromide, and an iodide. The metal oxide precursor may be an oxide precursor of at least one metal selected from Li, Ti, Al, Zr, and Si. For example, the metal oxide precursor may be at least one selected from lithium hydroxide (LiOH), aluminum tri-sec-butoxide, silicon tetraethoxide, and titanium butoxide.

According to another embodiment, during the contacting of the base material with the metal oxide or the metal oxide precursor, at least one selected from an electrically conductive material and an ionically conductive material, or a precursor material thereof, for example at least one selected from a conductive metal and a carbonaceous material, or a precursor thereof, may be additionally mixed together. Alternatively, if milling is further performed, an electrically conductive material and/or an ionically conductive material may be added during the contacting of the base material with the metal oxide or the metal oxide precursor or during the milling.

While not wanting to be bound by theory, it is understood that the electrically conductive material, e.g., the carbonaceous material or the conductive metal, if present may contribute to an increase in the electrical conductivity of the anode active material and the ionically conductive material may contribute to an increase in lithium-ion conductivity.

The ionically conductive material may be an oxide or a phosphate having an ionic conductivity of about $10^{-2}$ to about $10^{-6}$ Siemens per centimeter (S/cm), specifically about $10^{-3}$ to about $10^{-5}$ S/cm.

The base material which is alloyable with lithium may be at least one selected from Si, $SiO_x$ (wherein $0<x<2$), and a Si alloy. The base material may have an average particle size of about 3 nanometers (nm) to about 10,000 nm, specifically about 6 nm to about 5,000 nm, more specifically about 12 nm to about 2,500 nm. Examples of the Si alloy include $AlSi_2$, $Cu_5Si$, $Mg_2Si$, $NiSi$, $TiSi_2$, and $Si_7Ti_4Ni_4$.

The heat treating under the nitrogen and/or ammonia atmosphere may be performed at the temperature of about 300 to about 1500° C., specifically about 400 to about 1400° C., more specifically about 500 to about 1300° C. For example, when ammonia is used, the nitriding may be performed at temperature of about 300 to about 900° C., specifically about 350 to about 700° C.

According to an embodiment, prior to the heat treating of the mixture, a nitrogenous compound may be further added to the mixture. The nitrogeneous compound may be at least one selected from a urea, thiourea, hydrazine, guanidine, amidine, amide, thioamide, and cyanamide. The nitrogenous compound may comprise at least one selected from urea, hydrazine, ethylenediamine, and cyanamide. Other representative nitrogeneous compounds include phenylhydrazine, N,N'-diphenylhydrazine, octadecylhydrazine, benzoylhydrazine, thiourea, N-butylurea, stearylamide, oleylamide, 1,3-diphenylguanidine, 1,2,3-tributylguanidine, benzamidine, octadecamidine, N,N'-dimethylstearamidine, dicyanamide, guanylurea, and aminoguanidine. If the nitrogenous compound is additionally used, the formation of the metal nitride may be promoted and a carbon component may simultaneously remain.

An anode according to an embodiment may include the anode active material. The anode may be formed by, for example, forming an anode active material composition including the anode active material and a binder, and disposing the anode active material composition in a selected shape, e.g., a film shape. The anode may be formed by coating the anode active material composition on a current collector, for example, a copper foil.

In detail, an anode active material composition is prepared and then directly coated on a copper foil current collector to produce an anode. Alternatively, the anode active material composition may be cast on a separate support and a composite comprising a film of the anode active material separated from the support and laminated on a copper film current collector to produce an anode. The anode production method may not be limited thereto and other suitable methods may also be used to produce the anode.

It would be desirable to charge a battery at a high rate, e.g., at about a C rate to about a 20 C rate, specifically at about a 2 C rate to about a 10 C rate, to provide high capacity. To charge the battery at a high rate, a material having low electrical resistance is desired. To reduce the resistance of an electrode, various conductive agents may be used, and examples thereof are carbon black and graphite particles. As another method for producing the anode, the anode active material composition may be printed on a flexible electrode substrate to manufacture a printable battery.

A lithium battery according to an embodiment includes the anode. The lithium battery also includes a cathode and a separator between the anode and the cathode.

An example of a method of manufacturing the lithium battery is now described in further detail below.

First, a cathode active material composition including a cathode active material, a conductive material, a binder, and a solvent is prepared. The cathode active material composition may be directly coated on a metal current collector and dried to produce a cathode. Alternatively, the cathode active material composition may be cast on a separate support and a composite cathode active material film separated from the support may be laminated on a metal current collector to produce a cathode.

As the cathode active material, any suitable lithium-containing metal oxide may be used. The lithium-containing metal oxide may comprise, for example, at least one selected from $LiCoO_2$, $LiMn_xO_{2x}$ (wherein x=about 1 to about 2), $LiNi_{1-x}Mn_xO_2$ (wherein $0\leq x\leq 1$), and $LiNi_{1-x-y}Co_xMn_yO_2$ (wherein $0\leq x\leq 0.5$, $0\leq y\leq 0.5$). For example, $LiMn_2O_4$, $LiCoO_2$, $LiNiO_2$, $LiFeO_2$, $V_2O_5$, TiS, and MoS, which are compounds that intercalate and deintercalate lithium, may be used. As a conductive material, carbon black or graphite particles may be used, and as a binder, a vinylidene fluoride/hexafluoropropylene copolymer; polyvinylidenefluoride (PVDF), polyacrylonitirle, polymethylmethacrylate, polytetrafluoroethylene, a combination thereof; or a styrene butadiene rubber-based polymer; or the like may be used, and as a solvent, N-methylpyrrolidone, acetone, water, or the like may be used. Amounts of the cathode active material, the conductive material, the binder, and the solvent may be determined by one of skill in the art without undue experimentation.

Any suitable separator for a lithium battery may be used. The separator may have low resistance to flow of electrolytic ions and excellent electrolyte retention capability. For example, the separator may be at least one selected from glass fiber, polyester, Teflon, polyethylene, polypropylene, and polytetrafluoroethylene (PTFE). These materials may be used in the form of a non-woven or a woven fabric. In a lithium ion battery, a foldable separator comprising, for example, polyethylene or polypropylene may be used, and in a lithium ion polymer battery, a separator that has suitable organic electrolyte retention capability may be used. Examples of methods of manufacturing such separators are described below.

To manufacture a separator, in an embodiment a polymer resin, a filler, and a solvent are combined to prepare a separator composition, and then the separator composition is directly coated on an electrode and dried to form a separator film. Alternatively, the separator composition may be cast on a support, followed by drying, and then, a separator film may be separated from the support and laminated on the electrode.

The polymer resin may not be limited and may be any suitable binder for an electrode. Examples of the polymer resin include a vinylidenefluoride/hexafluoropropylene copolymer; polyvinylidenefluoride, polyacrylonitrile, and polymethylmethacrylate. A combination comprising at least one of the foregoing can be used.

The electrolyte may comprise at least one salt selected from a lithium salt, such as $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ (wherein x and y are natural numbers), LiCl, and LiI. The salt may be dissolved in a solvent, such as at least one selected from propylene carbonate, ethylene carbonate, fluoroethylene carbonate, diethyl carbonate, methylethyl carbonate, methylpropyl carbonate, butylene carbonate, benzonitrile, acetonitrile, tetrahydrofurane, 2-methyltetrahydrofurane, γ-butyrolactone, dioxorane, 4-methyldioxorane, N,N-dimethylformamide, di methylacetamide, dimethylsulfoxide, dioxane, 1,2-dimethoxyethane, sulforane, dichloroethane, chlorobenzene, nitrobenzene, dimethylcarbonate, methylisopropylcarbonate, ethylpropylcarbonate, dipropylcarbonate, dibutylcarbonate, diethyleneglycol, and dimethylether.

The separator may be disposed between the cathode and the anode to complete the manufacture of a battery assembly. The battery assembly may be wound or folded and then placed in a cylindrical or rectangular battery case, followed by addition of an electrolyte, thereby completing manufacture of a lithium rechargeable battery. Alternatively, two or more of the battery assemblies may be stacked in a bi-cell structure and then impregnated with an electrolyte, e.g., an organic electrolyte. The stacked structure may be placed in a pouch, followed by sealing, thereby completing manufacture of a lithium ion polymer battery.

Also, a plurality of the batteries may be stacked on each other to form a battery pack, and the battery pack may be used in an electric vehicle battery to provide improved high temperature and high power output.

Hereinafter, an embodiment is disclosed in further detail below with reference to examples. The examples, however, are used for illustrative purpose only and shall not limit the scope of the present disclosure.

Preparation of Anode Active Material

Synthesis Example 1

1.8 grams (g) of silicon nanoparticles (Aldrich Company, a particle size of about 50 nm) and 0.2 g of lithium titanium oxide nanoparticles (Nanoamor Company) were mixed, sealed in an Ar atmosphere, and then milled and mixed for 300 minutes with a high-energy mechanical milling device (SPEX CertiPrep, 8000 M) to prepare a composite. The composite was heat treated at the temperature of 850° C. in a nitrogen atmosphere to prepare an anode active material.

Synthesis Example 2

0.8 g of the composite prepared according to Synthesis Example 1 and 6.78 g of an aqueous urea solution (20 wt %) were mixed in a beaker, followed by drying in an oven at the temperature of 90° C. The dried product was heat treated at the temperature of 850° C. under a nitrogen atmosphere to prepare an anode active material.

Synthesis Example 3

1.6 g of silicon nanoparticles (Aldrich Company, a particle size of 50 nm) and 0.4 g of lithium titanium oxide (Ishihara Company, about 10 μm) particles were mixed, sealed in an Ar atmosphere, and then milled and mixed for 300 minutes with a high-energy mechanical milling device (SPEX CertiPrep, 8000 M) to prepare a composite. The composite was heat treated at the temperature of 850° C. in a nitrogen atmosphere to prepare an active material.

Synthesis Example 4

19.86 g of titanium butoxide ($Ti(OC_4H_9)_4$, Aldrich), 0.99 g of $LiOH.H_2O$, 4.86 g of a citric acid, and 35.5 g of ethanol were mixed in 50 mL vial, followed by 24 hours of stirring to prepare a lithium oxide precursor solution. 0.5 g of Si nanoparticles (Aldrich Company, a particle size of about 50 nm) and 50 g of ethanol were mixed in a separate beaker and the Si particles were dispersed using ultrasonic treatment for 1 hour. Then, 0.5 g of the lithium oxide precursor solution was added drop-wise thereto, and then the mixture dried in a constant-temperature bath at the temperature of 60° C. while stirring. The dried product was heat treated in a nitrogen atmosphere at the temperature of 850° C. to prepare an active material.

Synthesis Example 5

An active material was prepared in the same manner as in Synthesis Example 4, except that 4.24 g of the aqueous urea solution (20 wt %) was mixed together when the lithium oxide precursor was added.

Synthesis Example 6

19.86 g of titanium butoxide ($Ti(OC_4H_9)_4$, Aldrich), 4.86 g of citric acid, and 35.5 g of ethanol were mixed in 50 mL vial, followed by 24 hours of stirring to prepare an oxide precursor solution. 0.5 g of Si nanoparticles (Aldrich Company, a particle size of about 50 nm) and 50 g of ethanol were mixed in a separate beaker, and then the Si particles were dispersed using ultrasonic treatment for 1 hour. Then, 0.49 g of the oxide precursor solution was added drop-wise thereto, and dried in a constant-temperature bath at the temperature of 60° C. while stirring. The dried product was heat treated in a nitrogen atmosphere at the temperature of 850° C. to prepare an active material.

Synthesis Example 7

An active material was prepared in the same manner as in Synthesis Example 6, except that 4.24 g of an aqueous urea solution (20 wt %) was mixed together when the lithium oxide precursor was added.

Preparation of Anode Active Material

Example 1

0.02 g of the active material prepared according to Synthesis Example 1 and 0.16 g of graphite were mixed in a mortar, and then as a binder, 0.3 g of 6.7 wt % polyamide-imide (PAI; Torlon Company) solution in N-methylpyrrolidone (NMP)

was added thereto, followed by mixing. The mixture was coated on a copper (Cu) foil and dried in an oven at the temperature of 90° C. for 1 hour, followed by heat treating in a vacuum oven at the temperature of 220° C. for 2 hours to complete manufacture of an electrode.

Example 2

An electrode was manufactured in the same manner as in Example 1, except that the active material prepared according to Synthesis Example 2 was used instead of the active material prepared according to Synthesis Example 1, and 0.026 g of the active material and 0.154 g of graphite were used.

Example 3

An electrode was manufactured in the same manner as in Example 1, except that the active material prepared according to Synthesis Example 3 was used instead of the active material prepared according to Synthesis Example 1, and 0.027 g of the active material and 0.153 g of graphite were used.

Example 4

An electrode was manufactured in the same manner as in Example 1, except that the active material prepared according to Synthesis Example 4 was used instead of the active material prepared according to Synthesis Example 1, and 0.018 g of the active material and 0.162 g of graphite were used.

Example 5

An electrode was manufactured in the same manner as in Example 1, except that the active material prepared according to Synthesis Example 5 was used instead of the active material prepared according to Synthesis Example 1, and 0.026 g of the active material and 0.154 g of graphite were used.

Example 6

An electrode was manufactured in the same manner as in Example 1, except that the active material prepared according to Synthesis Example 7 was used instead of the active material prepared according to Synthesis Example 1, and 0.0234 g of the active material and 0.1566 g of graphite were used.

Comparative Example 1

An electrode was manufactured in the same manner as in Example 1, except that 0.018 g of Si particles were used instead of the active material prepared according to Synthesis Example 1 and 0.162 g of graphite was used.

Manufacture of a Battery

A 2032-type coin cell was manufactured using each of the electrodes manufactured according to Examples 1 to 6 and Comparative Example 1 as an anode and Li metal as a cathode.

Cycle Characteristics Test

The cells were charged and discharged in a voltage range between about 1.5 V and about 0.01 V.

The electrolyte was 1.5M LiPF$_6$ dissolved in a combination of ethylene carbonate (EC), diethylene carbonate (DEC), and fluoroethylene carbonate at a volumetric ratio of 5/70/25. In a first cycle of charging and discharging, constant-current charging was performed with respect to a Li electrode at a current of 0.1 C until a voltage reached 0.01 V and then constant-voltage charging was performed until the current reached 0.01 C. Once the charging was completed, the charged cells were left for about 10 minutes and then constant-current discharging was performed thereon at the current of 0.1 C until the voltage reached 1.5 V. In a second cycle, constant-current charging was performed at a current of 0.2 C with respect to the Li electrode until the voltage reached 0.01 V and then constant-voltage charging was performed until the current reached 0.01 C. Once the charging was completed, the charged cells were left for about 10 minutes and then constant-current discharging was performed thereon at the current of 0.2 C until the voltage reached 1.5 V. Lifespan or capacity retention rate characteristics were evaluated as follows: constant-current charging was performed with respect to the Li electrode at the current of 1 C until the voltage reached 0.01 V and then constant-voltage charging was performed until the current reached 0.01 C, and once the charging was completed, the charged cells were left for about 10 minutes and then constant-current discharging was performed thereon at the current of 1 C until the voltage reached 1.5 V, and this charging and discharging cycle was repeated 50 times. The experimental results are shown in Table 2 below. Charging corresponds to alloying and discharging corresponds to de-alloying.

Table 1 shows XPS results of the active materials of Synthesis Examples 1, and 4 to 7. Referring to Table 1, when an oxide precursor was used and urea was mixed together (Synthesis Example 5 and Synthesis Example 7), an atomic ratio of nitrogen to oxygen when determined using the intensity of the nitrogen 1s and oxygen 1s peaks, was high. Also, when lithium titanium oxide (LTO) was milled (Synthesis Example 1), although urea was not included, the atomic ratio of nitrogen to oxygen was high, based on the intensity of the nitrogen 1s and oxygen 1s peaks.

Table 2 below shows charge and discharge results of the cells of Comparative Example 1 and Examples 1 to 5. Referring to Table 2, under the same conditions, and when compared to when pure Si was used (Comparative Example 1), when a metal nitride was used (Examples 1 to 6) initial efficiency and capacity retention rate both increased. In particular, when LTO particles were milled (Examples 1 to 3), compared to when the oxide precursor was used, the cycle efficiency was surprisingly improved.

TABLE 1

| | C1s | N1s | O1s | Si2p | Ti2p | N1s/O1s |
|---|---|---|---|---|---|---|
| Synthesis Example 1 | 7.35 | 13.84 | 48.2 | 30.16 | 0.45 | 0.287137 |
| Synthesis Example 4 | 8.08 | 3.58 | 56.94 | 30.69 | 0.71 | 0.062873 |
| Synthesis Example 5 | 32.8 | 10.74 | 32.73 | 21.67 | 2.05 | 0.328139 |
| Synthesis Example 6 | 15.06 | 2.27 | 52.91 | 25.6 | 4.16 | 0.042903 |
| Synthesis Example 7 | 31.08 | 8.51 | 36.83 | 18.7 | 4.88 | 0.231062 |

TABLE 2

| | 1$^{st}$ cycle discharge capacity (mAh/g) | 1$^{st}$ cycle efficiency (%) | Capacity retention rate (1C, 50$^{th}$ cycle) (%) |
|---|---|---|---|
| Comparative Example 1 | 534 | 74.4 | 88.0 |
| Example 1 | 596 | 76.7 | 91.9 |
| Example 2 | 584 | 76.3 | 92.7 |
| Example 3 | 555 | 77.3 | 93.0 |

TABLE 2-continued

| | 1st cycle discharge capacity (mAh/g) | 1st cycle efficiency (%) | Capacity retention rate (1C, 50th cycle) (%) |
|---|---|---|---|
| Example 4 | 586 | 74.8 | 90.4 |
| Example 5 | 591 | 72.8 | 92.8 |
| Example 6 | 656 | 73.5 | 91.8 |

Figure 2:
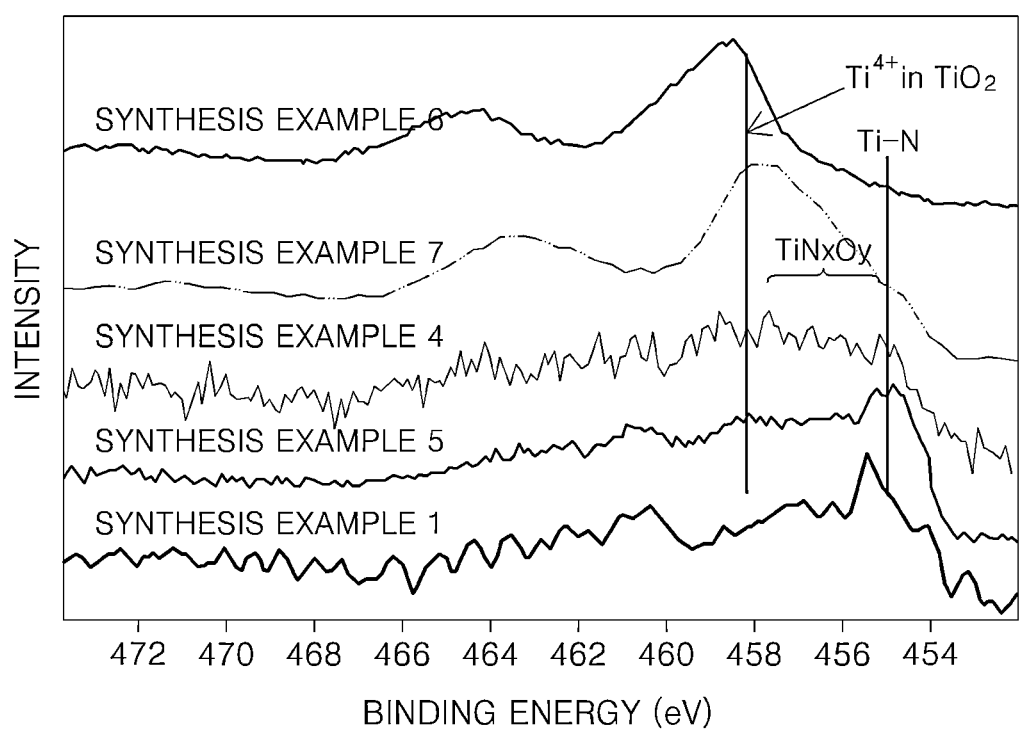
FIGS. 2 and 3 are graphs of intensity (arbitrary units) versus binding energy (electron volts, eV) and show the results of X-ray photoelectron spectroscopy (XPS) analysis of anode active materials for a lithium rechargeable battery prepared according to Synthesis Examples 1 and 4 to 7.
Figure 3:
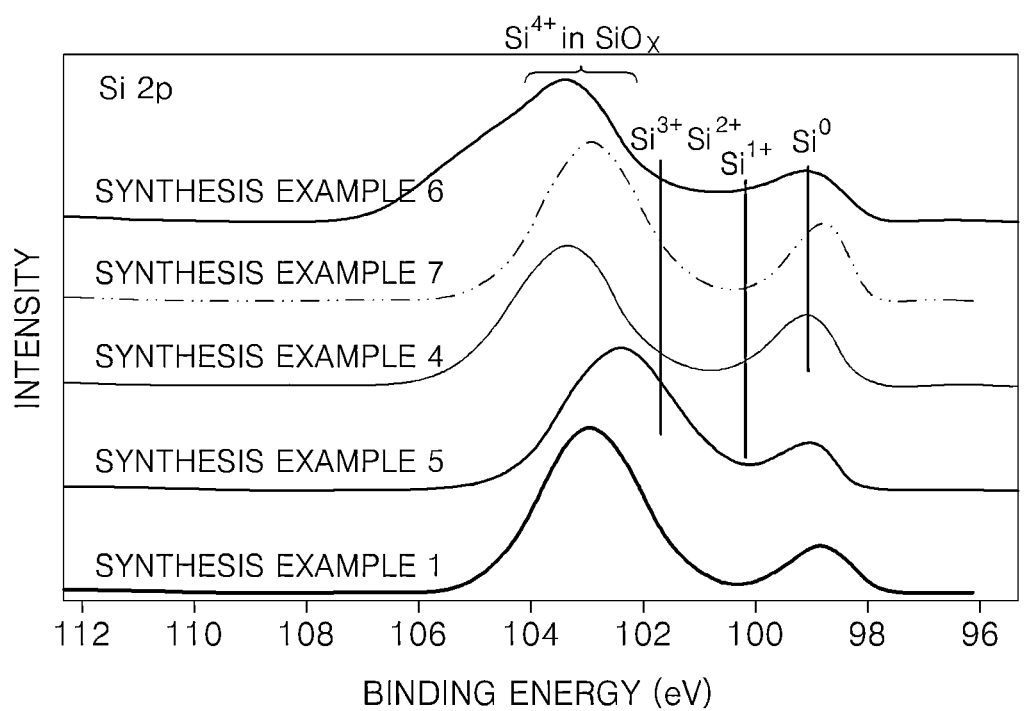

FIGS. 2 and 3 are graphs showing XPS results of the active materials of Synthesis Examples 1, and 4 to 7. Referring to FIGS. 2 and 3, it was confirmed that Ti—N or Ti—O—N, and Si—N or Si—O—N bonds were formed in each of the active materials.

Figure 4:
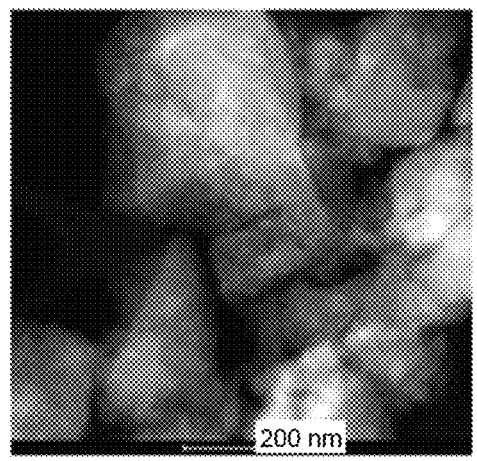
FIGS. 4 and 5 are transmission electron micrographs of the active materials prepared according to Synthesis Example 1 and Synthesis Example 5, respectively.
Figure 5:
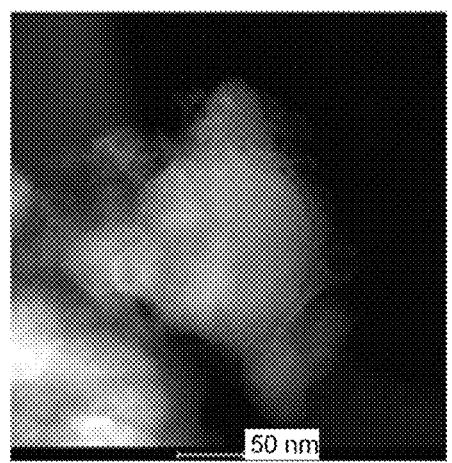

FIGS. 4 and 5 show TEM images of the active materials prepared according to Synthesis Example 1 and Synthesis Example 5, respectively. FIG. 4 shows that the respective components are each in the form of a particle and FIG. 5 shows that a silicon particle is coated with a precursor. Referring to FIGS. 4 and 5, it was confirmed that silicon was well mixed with the metal oxide or nitride.

As described above, a lithium rechargeable battery including an anode active material according to an embodiment has high initial efficiency and excellent lifespan characteristics.

It should be understood that the exemplary embodiments described herein should be considered in a descriptive sense only and not for purposes of limitation. Descriptions of features, advantages, or aspects within each embodiment shall be considered as available for other similar features, advantages, or aspects in other embodiments.

What is claimed is:

1. An anode active material for a lithium rechargeable battery, the anode active material comprising:
   a base material which is alloyable with lithium; and
   a layer comprising a metal nitride disposed on the base material,
   wherein the metal nitride comprises at least one metal selected from lithium, titanium, aluminum, zirconium, and silicon, and
   wherein the base material is at least one selected from Si, $SiO_x$ wherein $0<x<2$, and a Si alloy.

2. The anode active material of claim 1, wherein the Si alloy is an alloy of Si and at least one selected from Al, Ca, Cu, Mg, Ni, and Ti.

3. The anode active material of claim 1, wherein the Si alloy is at least one selected from $AlSi_2$, $Cu_5Si$, $Mg_2Si$, NiSi, $TiSi_2$, and $Si_7Ti_4Ni_4$.

4. The anode active material of claim 1, wherein the metal nitride comprises oxygen.

5. The anode active material of claim 1, wherein the metal nitride comprises at least one bond selected from Li—N, Li—O—N, Ti—N, Ti—O—N, Al—N, Al—O—N, Zr—N, Zr—O—N, Si—N, and Si—O—N.

6. The anode active material of claim 1, wherein the metal nitride is a metal oxynitride which has an atomic concentration ratio of oxygen to nitrogen of about 0.04 to about 0.95, when determined by X-ray photoelectron spectroscopy analysis of the oxygen 1s and nitrogen 1s peaks.

7. The anode active material of claim 6, wherein the atomic concentration ratio of oxygen to nitrogen is about 0.05 to about 0.6, when determined by X-ray photoelectron spectroscopy analysis of the oxygen 1s and nitrogen 1s peaks.

8. The anode active material of claim 1, further comprising at least one selected from an electrically conductive material and an ionically conductive material on the base material.

9. The anode active material of claim 8, wherein the electrically conductive material is a conductive metal or a carbonaceous material.

10. The anode active material of claim 8, wherein the ionically conductive material is an oxide or a phosphate having an ionic conductivity of about $10^{-2}$ to about $10^{-6}$ Siemens per centimeter.

11. A method of preparing the anode active material of claim 1, the method comprising:
   contacting a base material which is alloyable with lithium with at least one selected from a metal oxide precursor and a metal oxide to prepare a mixture; and
   heat treating the mixture in an atmosphere comprising at least one selected from nitrogen and ammonia to prepare the anode active material,
   wherein the at least one selected from a metal oxide precursor and a metal oxide comprises at least one metal selected from lithium, titanium, aluminum, zirconium, and silicon, and
   wherein the base material is at least one selected from Si, $SiO_x$ wherein $0<x<2$, and a Si alloy.

12. The method of claim 11, wherein the metal oxide precursor comprises at least one selected from a halide, hydroxide, carbonate, and an alkoxide of a metal.

13. The method of claim 11, wherein the contacting further comprises milling.

14. The method of claim 11, further comprising, prior to the heat treating of the mixture, drying the mixture under ambient pressure or a reduced pressure at a temperature of room temperature to about 90° C.

15. The method of claim 11, wherein the contacting further comprises contacting with at least one selected from an electrically conductive material and an ionically conductive material.

16. The method of claim 15, wherein the electrically conductive material is a conductive metal or a carbonaceous material.

17. The method of claim 15, wherein the ionically conductive material is an oxide or phosphate having an ionic conductivity of about $10^{-2}$ to about $10^{-6}$ Siemens per centimeter.

18. The method of claim 11, wherein prior to the heat treating, the mixture is further contacted with a nitrogenous compound.

19. The method of claim 18, wherein the nitrogenous compound is at least one selected from urea, hydrazine, ethylenediamine, and cyanamide.

20. The method of claim 11, wherein the heat treating is performed at a temperature of about 300 to about 1500° C.

21. An anode comprising the anode active material of claim 1.

22. A lithium rechargeable battery comprising the anode of claim 21.

* * * * *